United States Patent
Zhong et al.

(10) Patent No.: US 11,475,085 B2
(45) Date of Patent: Oct. 18, 2022

(54) GENERATING PERSONALIZED QUERY SUGGESTIONS

(71) Applicant: Microsoft Technology Licensing, LLC, Redmond, WA (US)

(72) Inventors: Jianling Zhong, San Jose, CA (US); Weiwei Guo, Foster City, CA (US); Lin Guo, Sunnyvale, CA (US); Huiji Gao, Sunnyvale, CA (US); Bo Long, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 238 days.

(21) Appl. No.: 16/801,725

(22) Filed: Feb. 26, 2020

(65) Prior Publication Data

US 2021/0263982 A1 Aug. 26, 2021

(51) Int. Cl.
*G06F 16/9535* (2019.01)
*G06N 20/00* (2019.01)
*G06F 16/9538* (2019.01)

(52) U.S. Cl.
CPC ...... *G06F 16/9535* (2019.01); *G06F 16/9538* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 2019/0018884 A1* | 1/2019 | Wakankar | G06F 16/248 |
| 2020/0349180 A1* | 11/2020 | Kempf | G06F 40/284 |

* cited by examiner

*Primary Examiner* — Amresh Singh
(74) *Attorney, Agent, or Firm* — Schwegman Lundberg & Woessner, P.A.

(57) ABSTRACT

Machine learning based method for generating personalized query suggestions is described. Different users may have different search intent even when they are inputting the same search query. The technical problem of personalizing search query suggestions produced by a machine learning model is addressed by extending the sequence to sequence machine learning model framework to be able to take into consideration additional, personalized features of the user, such as, e.g., profile industry, language, geographic location, etc. This methodology includes an offline model training framework as well as an online serving framework.

18 Claims, 8 Drawing Sheets

GENERATING PERSONALIZED QUERY SUGGESTIONS

TECHNICAL FIELD

This application relates to the technical fields of software and/or hardware technology and, in one example embodiment, to machine learning based method for generating personalized query suggestions.

BACKGROUND

An online connection network system is a web-based platform (e.g., a connection networking web site) that may be accessed by a user via a web browser or via a mobile application provided on a mobile phone, a tablet, etc. It may be a business-focused connection network designed specifically for the business community, where registered members establish and document networks of people they know and trust professionally. Each registered member may be represented by a member profile, which, in turn, may be represented by one or more web pages or a structured representation of the member's information in XML (Extensible Markup Language), JSON (JavaScript Object Notation) or similar format. A member's profile web page may include various information such as, e.g., the name of a member, current and previous geographic location of a member, current and previous employment information of a member, information related to education of a member, information about professional accomplishments of a member, publications, patents, as well as information about the member's professional skills. An online connection network system includes a search engine that permits members to search for various types of information available within the system, such as member profiles, job postings, publications related to science and technology, educational courses, etc. In addition to retrieving search results based on the query submitted by a member, the search engine may also generate query suggestions or related searches. For the purposes of this description the phrases "an online connection networking application" and "an online connection network system" may be referred to as and used interchangeably with the phrase "an online connection network" or merely "a connection network."

BRIEF DESCRIPTION OF DRAWINGS

Embodiments of the present invention are illustrated by way of example and not limitation in the figures of the accompanying drawings, in which like reference numbers indicate similar elements and in which.

OVERVIEW

A machine learning based method and system for generating personalized query suggestions in online connection networks are described. In the following description, for purposes of explanation, numerous specific details are set forth in order to provide a thorough understanding of an embodiment of the present invention. It will be evident, however, to one skilled in the art that the present invention may be practiced without these specific details.

As mentioned above, an online connection network system permits members to search for various types of information available within the system. As it may be an overwhelming task for a user to formulate a query that targets precisely the information the user is seeking, a search engine provided with the online connection network system is configured to produce search query suggestions, also referred to as related search or query expansion. A search engine configured to produce search query suggestions in addition to search results can be referred to as a related search system. In some embodiments, the related search problem is modeled using sequence to sequence (seq2seq) models. Related search is a way to provide members relevant search query suggestions, especially if the initial query issued by a member does not produce a satisfactory result, where the initial query—the set of keywords submitted by the member to the search engine via a user interface—is used as the source sequence into the encoder of the sequence to sequence model. A search query suggestion is the target sequence produced by the decoder of the of the sequence to sequence model based on the output of the encoder. In some existing systems, the same query suggestions are provided to different members that submitted the same initial query, even though different members may have different search intent even when they are inputting the same search query. For example, when searching for "linkedin," a software engineer may be more interested in "software engineer jobs," while a data scientist may be more interested in "data science jobs" or "analytics jobs."

In some embodiments, the technical problem of personalizing search query suggestions produced by a sequence to sequence model is addressed by extending the neural sequence to sequence model framework to be able to take into consideration additional, personalized features, such as, e.g., profile industry, language, geographic location, etc. This methodology includes an offline model training framework as well as an online serving framework.

DETAILED DESCRIPTION

The extended model (termed the suggested query model for the purposes of this description) may be used to provide localized versions of search query suggestions based on the member's language information, which improves the exiting technology by permitting the use of a single model as opposed to managing one model per language. The extended model can also produce search query suggestions that reflect the searching member's intent defined by the associated search vertical. For example, the same member has different intent when they are searching "software engineer" in the PEOPLE vertical vs in the JOBS vertical. A search vertical, for the purposes of this description, corresponds to an entity type, where the search is performed specifically for entities of that entity type, such as job postings or member profiles. The extended model can be configured to provide different suggestions in those different contexts. Personalization features could be member features found in the member profiles (such as, e.g., member's job title, industry, company, as well as education history, etc.), language/locale metadata features (that could either be member's interface language/locale information), vertical/context information (that could either be the explicit vertical the member chose to search in or the output of upstream intent detection), as well as the member's behavior data (that includes past queries a issued by the member).

Figure 4:
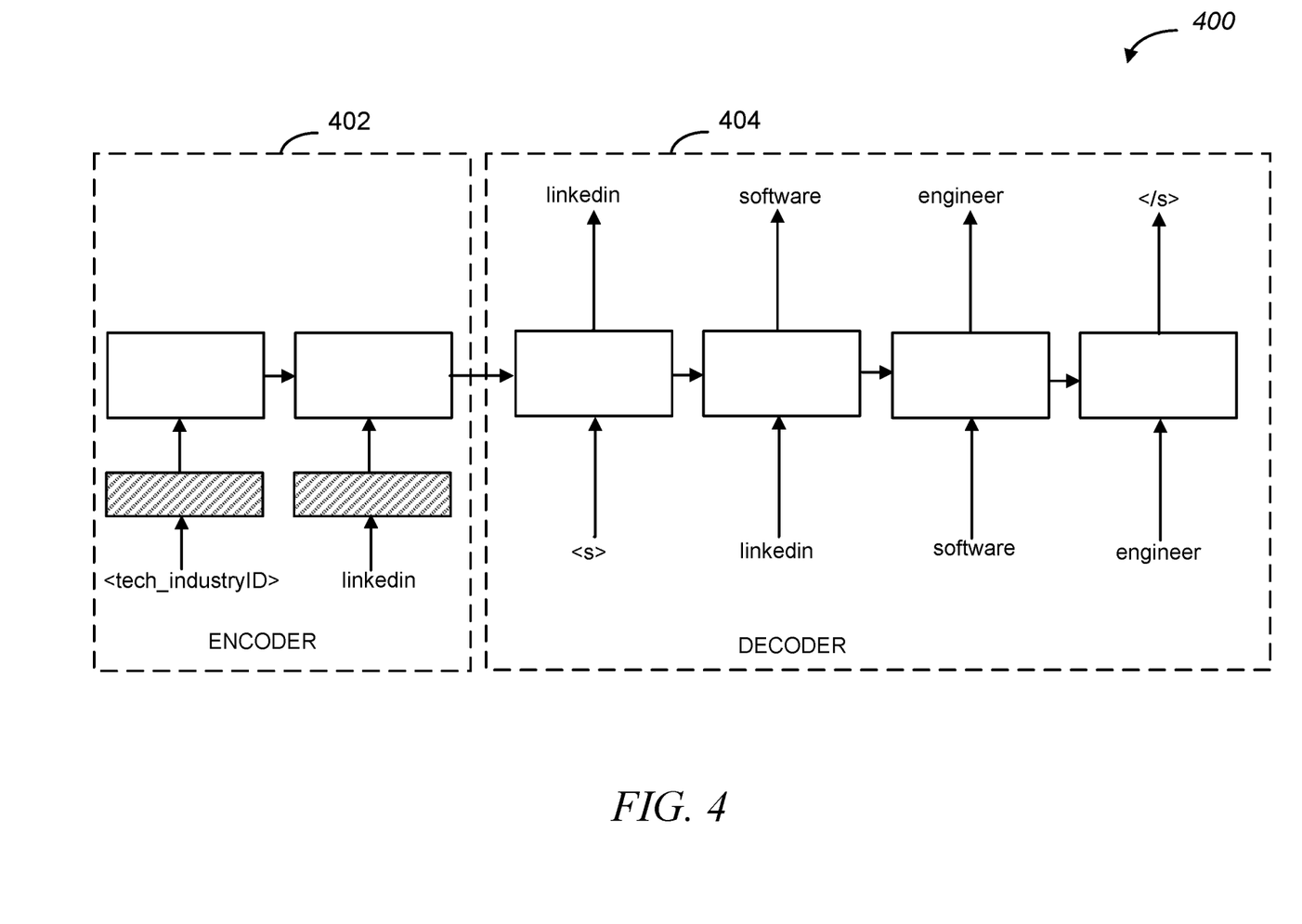
FIGS. 4-6 are diagrammatic representations of example approaches to incorporating a personalization feature into a suggested query model.
Figure 5:
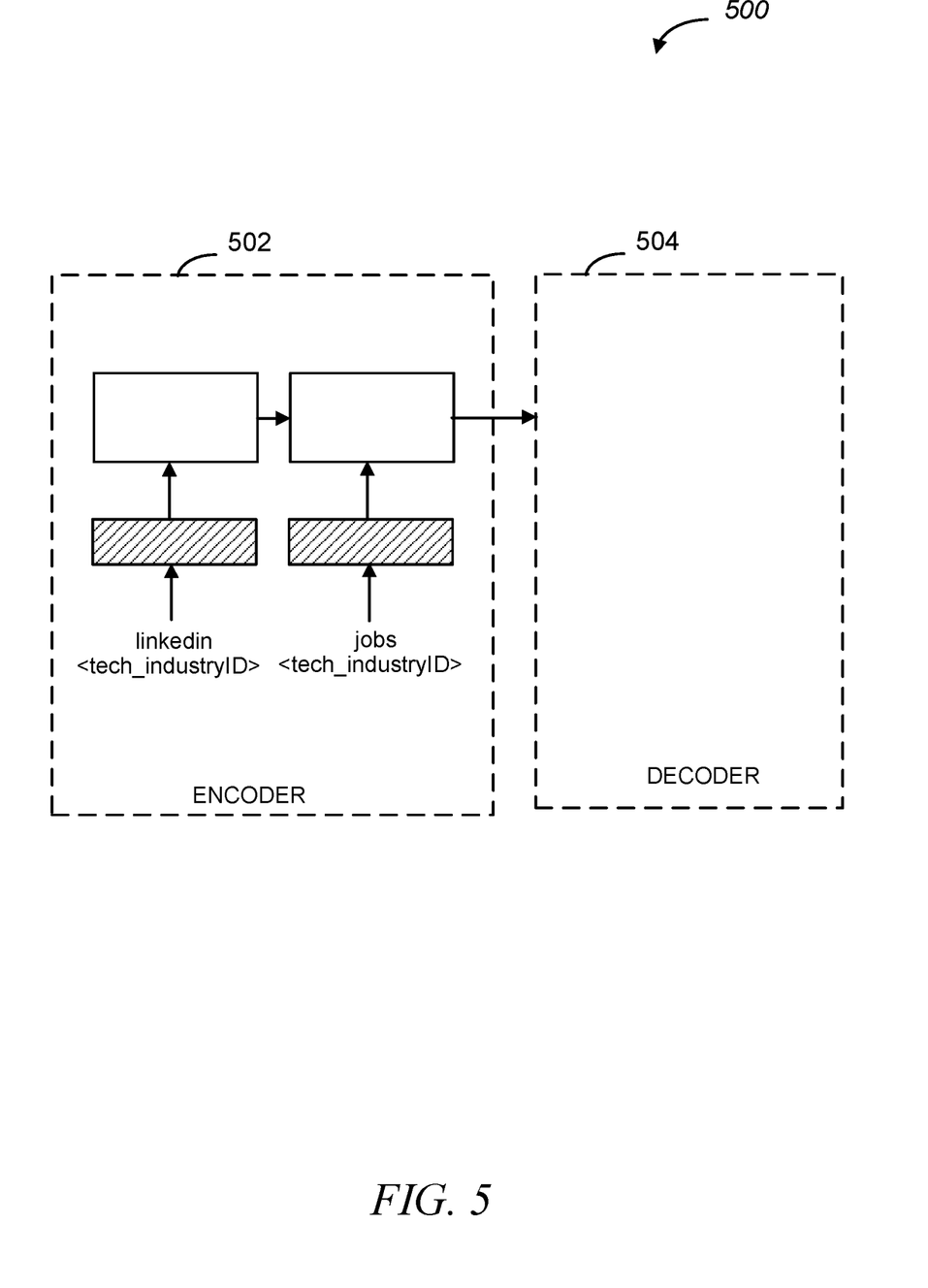
Figure 6:
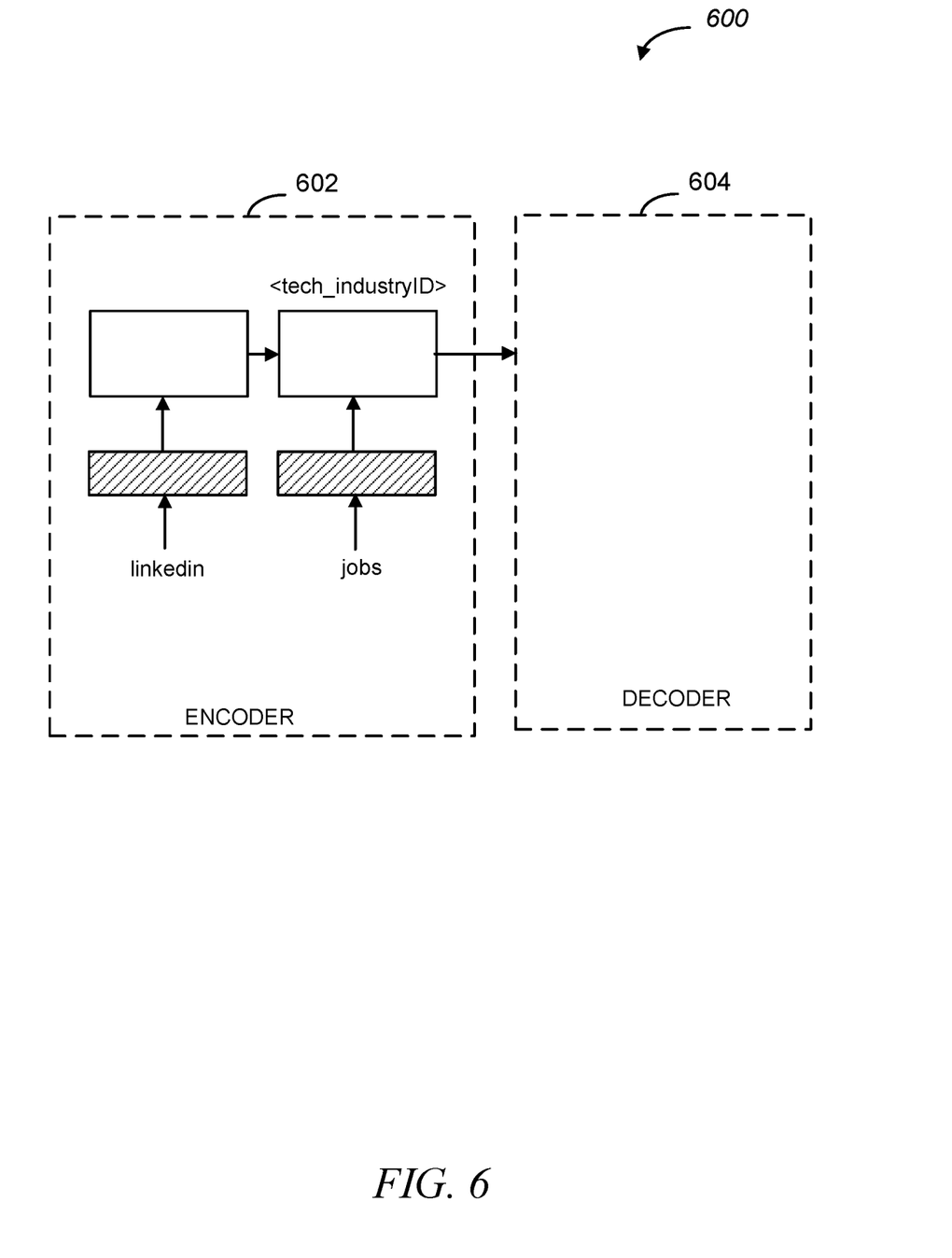

Personalization features can be incorporated into the suggested query model using a variety of techniques, such as adding the personalization feature as an additional vocabulary word (as shown in FIG. 4, which is described further below), by concatenating personalization feature embedding with word embeddings (as shown in FIG. 5, which is described further below), or concatenating the personalization feature to the hidden layer so as to change the input dimension into the decoder of the model (as shown in FIG. 6, which is described further below). The extended model is trained using queries previously submitted by members of the online connection network system together with personalization features.

Figure 1:
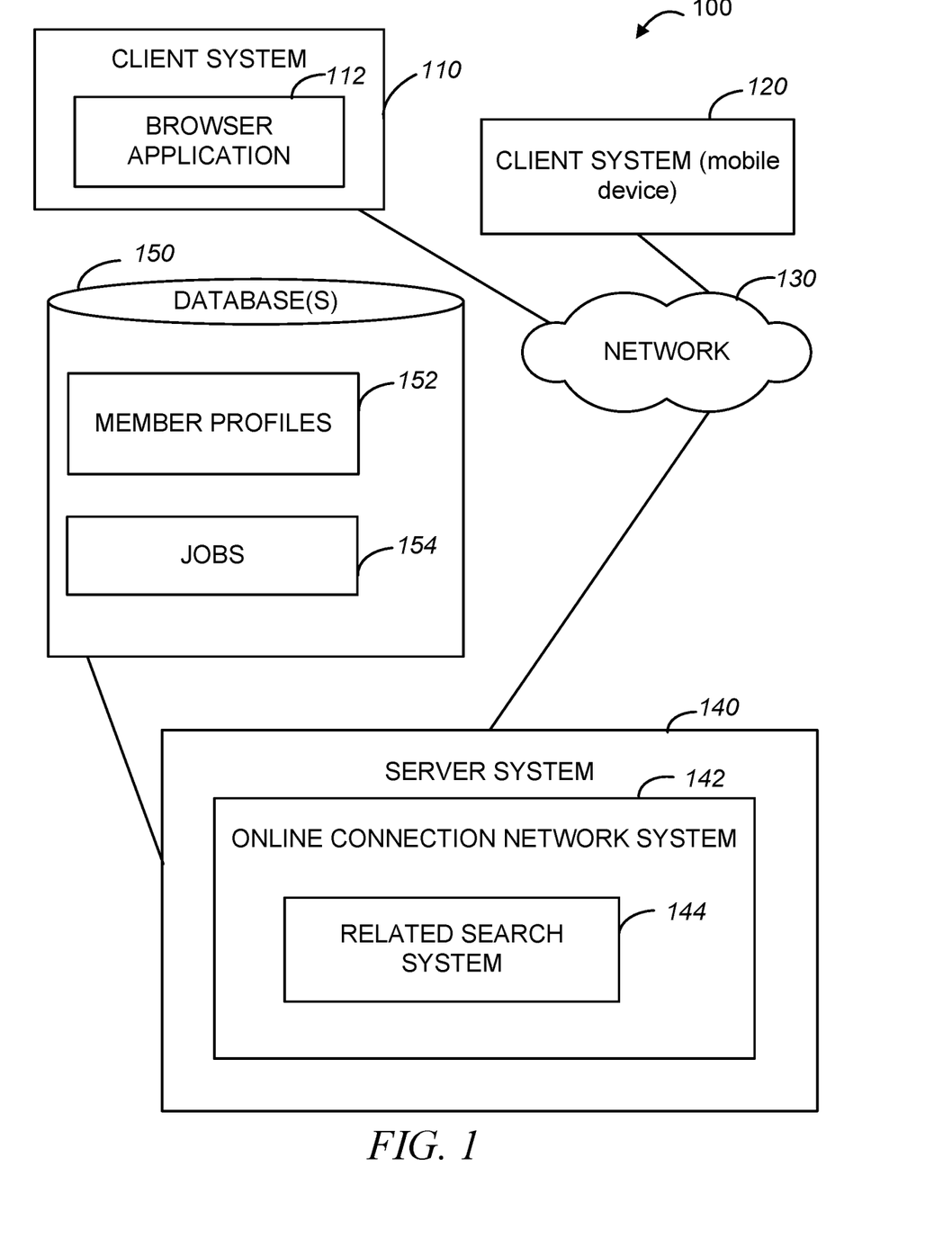
FIG. 1 is a diagrammatic representation of a network environment within which an example machine learning based method for generating personalized query suggestions may be implemented.

An example related search system may be implemented in the context of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an online connection network system 142. As explained above, each member of an online connection network is represented by a member profile that contains personal and professional information about the member and that may be associated with connection links that indicate the member's connection to other member profiles in the online connection network. Member profiles and related information may be stored in a database 150 as member profiles 152. The database 150 also stores other entities, such as jobs 154.

The client systems 110 and 120 can access the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a related search system 144. The related search system 144 is configured to perform the machine learning based method for generating personalized query suggestions in online connection networks, by applying methodologies discussed herein. Example architecture of the related search system 144 is illustrated in FIG. 2.

Figure 2:
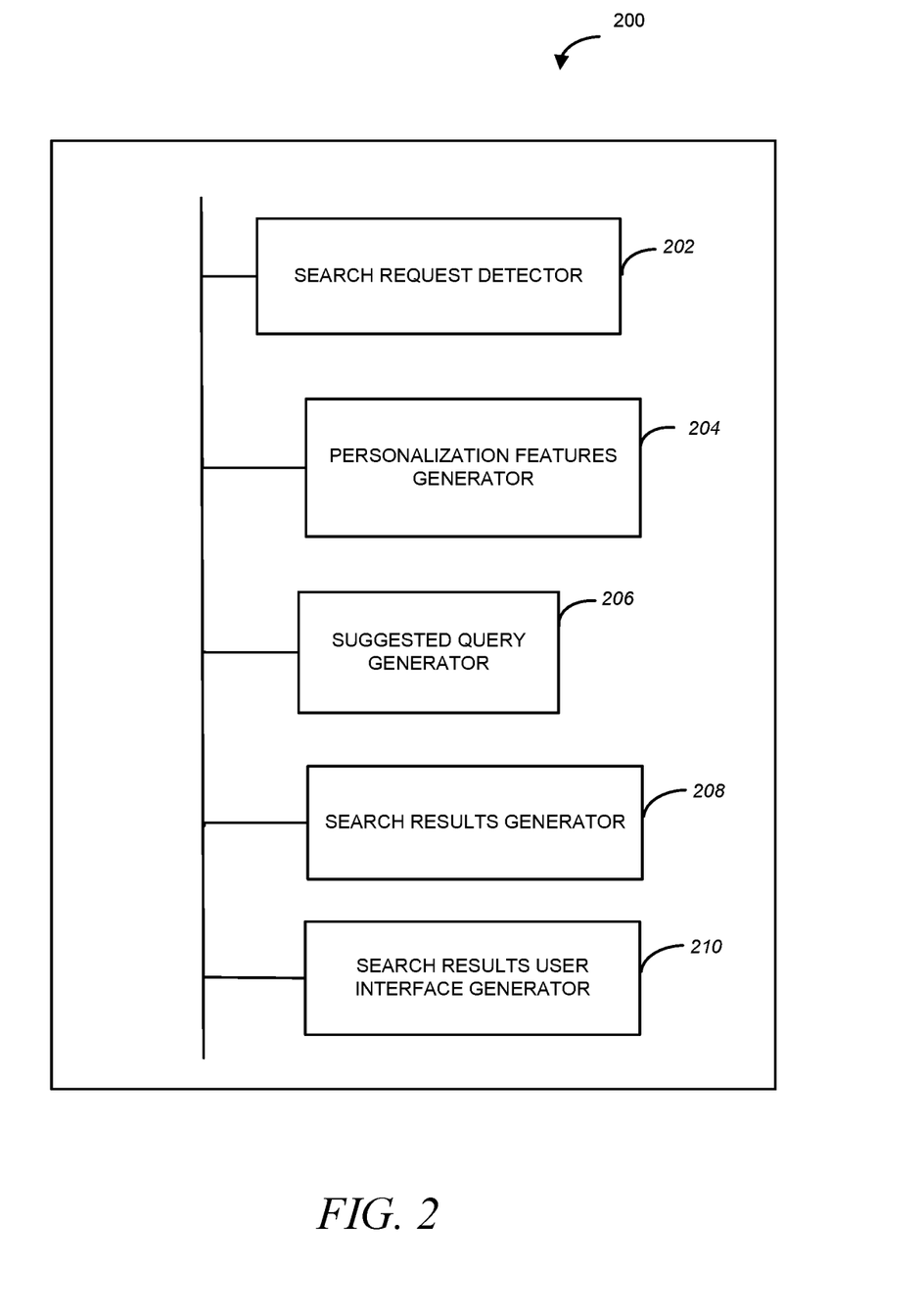
FIG. 2 is a block diagram of an architecture for machine learning based method for generating personalized query suggestions, in accordance with one example embodiment.

FIG. 2 is a block diagram of an architecture 200 used by the related search system 144 of FIG. 1. As shown in FIG. 2, the architecture 200 includes a search request detector 202, a personalization features generator 204, a suggested query generator 206, a search results generator 208, and a search results UI generator 210.

The search request detector 202 is configured to detect a search request submitted by a user, in the form of a text, via a user interface provided by an on-line communication network system and to determine a set of word embeddings from the search request. Word embeddings are vectors representing respective keywords in the search request. The personalization features generator 204 is configured to determine one or more personalization features associated with the user. As explained above, personalization features could be member features found in the member profiles (such as, e.g., member's job title, industry, company, as well as education history, etc.), language/locale metadata features (that could either be member's interface language/locale information, or real time language detection output from upstream query annotators), vertical/context information (that could either be the explicit vertical the member chose to search in or the output of upstream intent detection query annotators), as well as the member's behavior data (that includes past queries a issued by the member). The search results generator 208 is configured to generate search results based on the search request. The suggested query generator 206 is configured to generate a search query suggestion by executing a machine learning model that takes the set of word embeddings and the personalization feature as input. The search results UI generator 210 is configured to include the search query suggestion, together with the search results generated based on the search request submitted by the user, into a search results user interface for presentation on a display device of the user. Some operations performed by the related search system 144 may be described with reference to FIG. 3.

Figure 3:
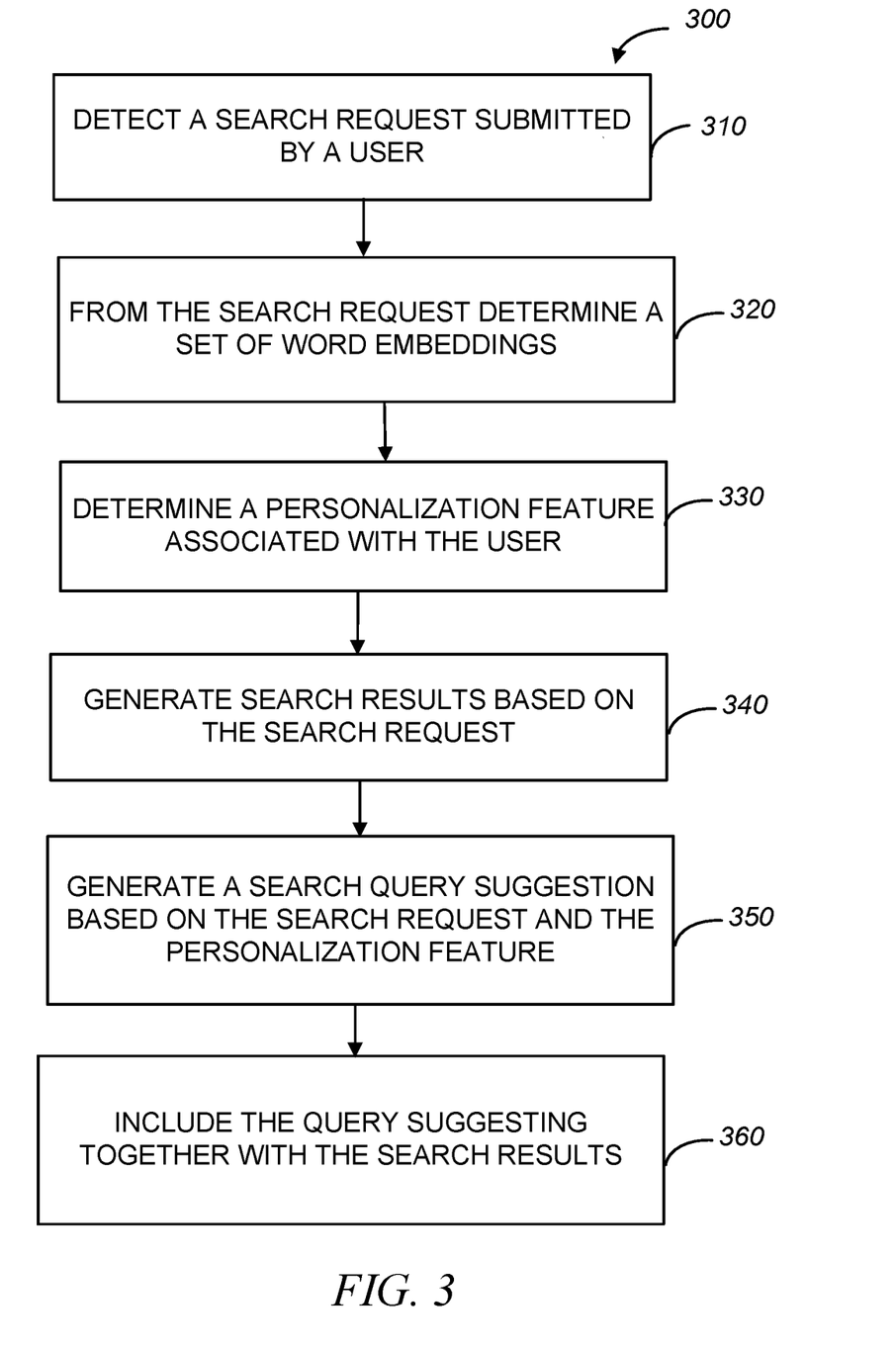
FIG. 3 is a flowchart illustrating machine learning based method for generating personalized query suggestions, in accordance with an example embodiment.

FIG. 3 is a flowchart of a method 300 for multi-objective optimization of job applications redistribution in an online connection network 142 of FIG. 1. The method 300 may be performed by processing logic that may comprise hardware (e.g., dedicated logic, programmable logic, microcode, etc.), software, or a combination of both. In one example embodiment, the processing logic resides at the server system 140 of FIG. 1.

As shown in FIG. 3, the method 300 commences at operation 310, with detecting, at operation 310, a search request submitted by a user. The search request is in the form of a text and can be submitted via a user interface provided by the on-line communication network system 142 of FIG. 1. At operation 320, the related search system 144 of FIG. 1 determines a set of word embeddings from the search request. At operation 330, the related search system 144 determines one or more personalization features associated with the user. The search results are generated at operation 340. In parallel with the generating of the search results, at operation 350, the related search system 144 generates a search query suggestion by executing a machine learning model (e.g., a sequence to sequence model) that takes the set of word embeddings and the personalization feature as input. At operation 360, the related search system 144 includes the search query suggestion, together with the search results generated based on the search request submitted by the user, into a search results user interface for presentation on a display device of the user. Some operations performed by the related search system 144 may be described with reference to FIG. 3.

FIG. 4-6 are diagrammatic representations of example approaches to incorporating a personalization feature into a suggested query model. In the diagram 400 of FIG. 4, the <tech_industryID> personalization feature is used as another word embedding in addition to the word embedding "linkedin" used by the encoder 402. The decoder 404 receives the hidden feature produced by the encoder 402 as output. With reference to FIG. 4-6, the <tech_industryID> personalization feature indicates that the member who submitted the initial search request is employed in (or otherwise associated with) the tech industry. It will be noted that, while the initial query submitted by a user via a UI provided by the online connection network system 142 of FIG. 1 is text data and the personalization feature is structured data, both the initial query and the personalization feature are treated as word embeddings in the encoder of the suggested query model.

In the diagram 500 of FIG. 5, in the encoder 502, the <tech_industryID> personalization feature is concatenated with which of the word embeddings "linkedin" and "jobs." Again, the decoder 504 receives the hidden feature produced by the encoder 502 as output. In the diagram 600 of FIG. 6, the <tech_industryID> personalization feature is concatenated to the hidden layer of the encoder 602 so as to change the input dimension into the decoder 604.

Figure 7:
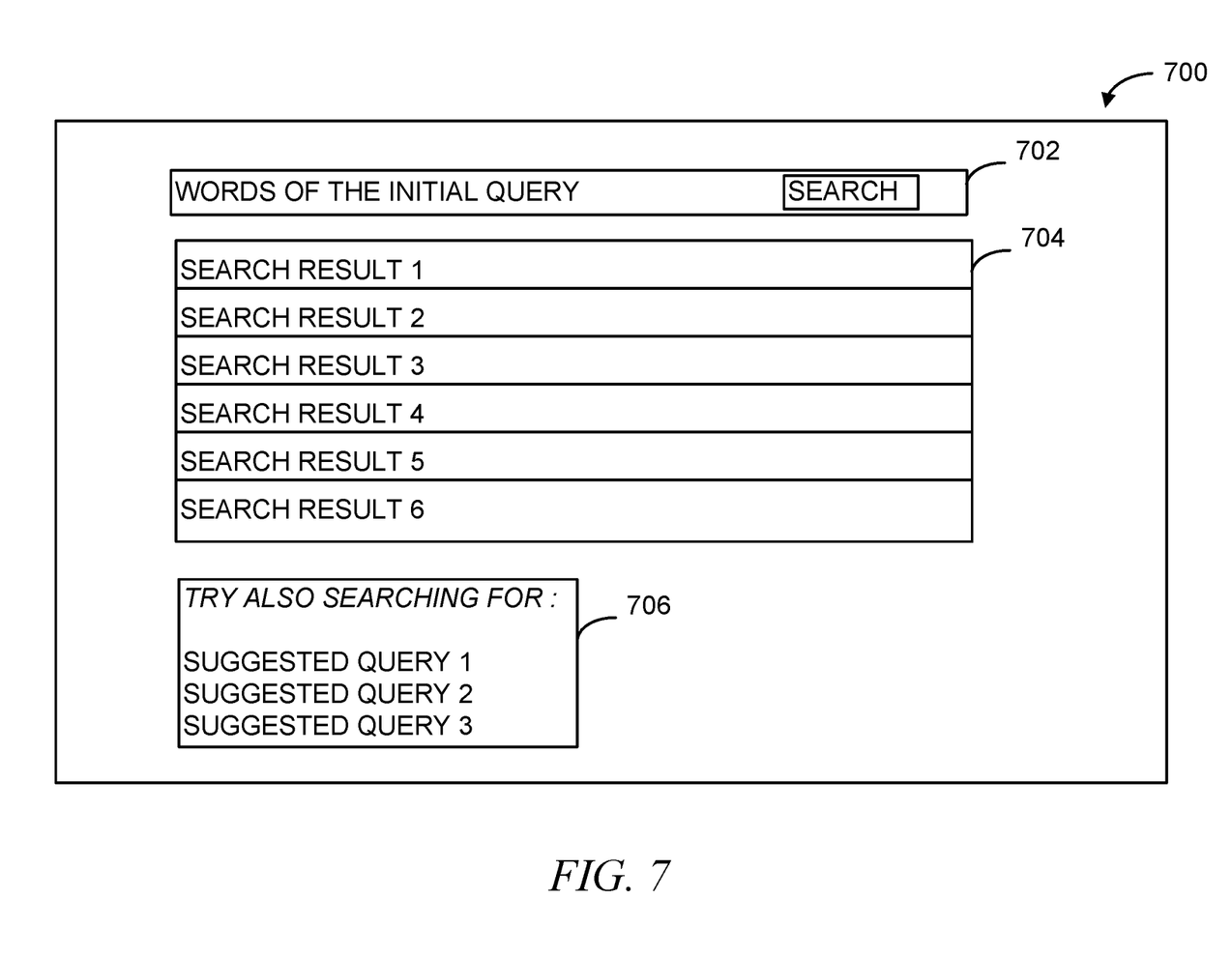
FIG. 7 is a diagrammatic representation of an example search results user interface (UI)

An example search results UI 700 generated by the online connection network system 142 of FIG. 1 is shown in FIG. 7. The search results UI 700 includes, in area 704, search results retrieved in response to the initial query submitted via the search box 702, and also includes search query suggestions in area 706. As the user scrolls down the search results and finds nothing, they'll see a list of "try searching for" suggestions. The search query suggestions may include different entity types. When the user selects a search query suggestion from the area 706, the related search system 144 of FIG. 1 detects the selection of a suggested query and process it to produce new search results to be communicated to the user.

Figure 8:
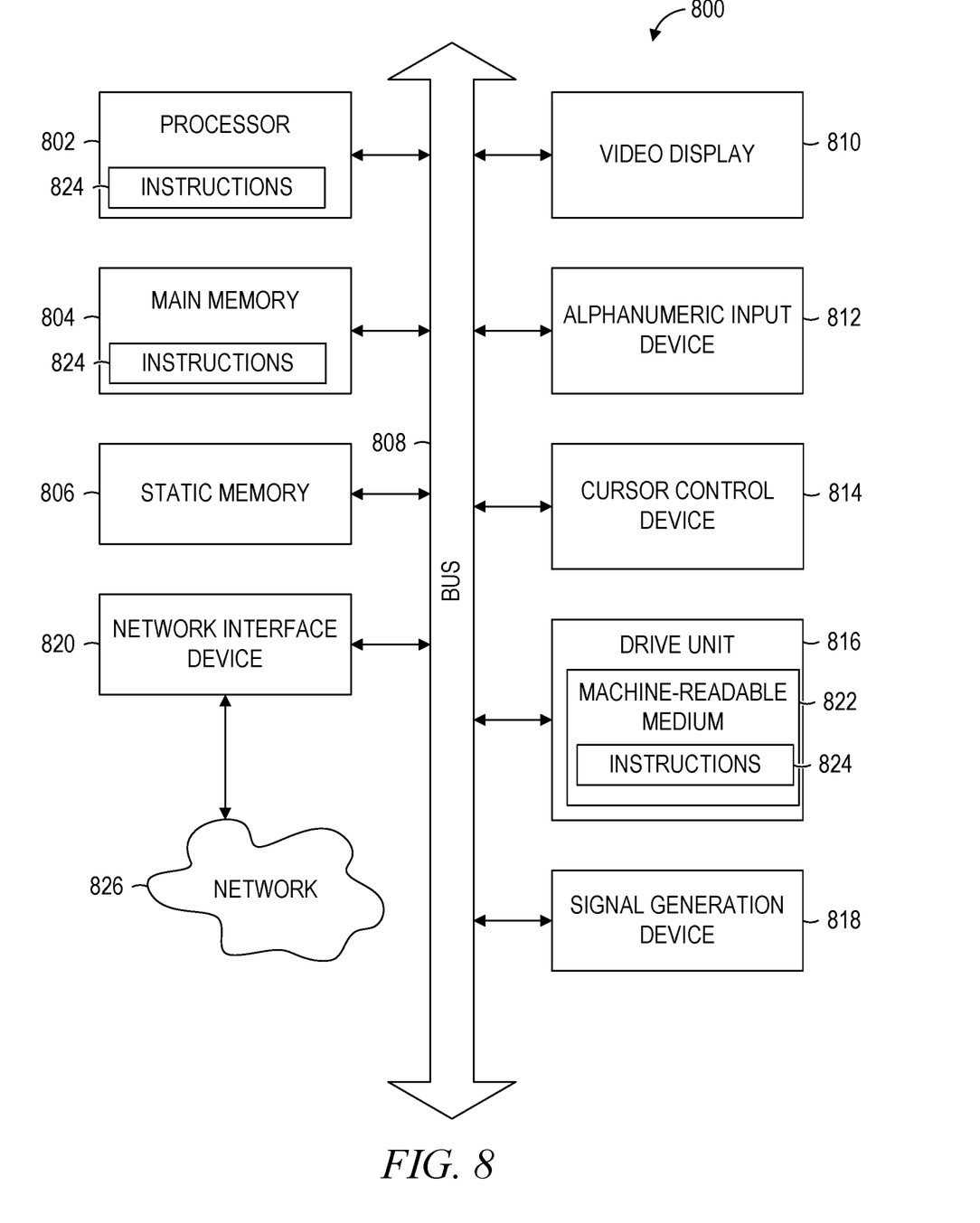
FIG. 8 is a diagrammatic representation of an example machine in the form of a computer system within which a set of instructions, for causing the machine to perform any one or more of the methodologies discussed herein, may be executed.

FIG. 8 is a diagrammatic representation of a machine in the example form of a computer system 800 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 804. The computer system 800 may further include a video display unit 810 (e.g., a liquid crystal display (LCD) or a cathode ray tube (CRT)). The computer system 800 also includes an alpha-numeric input device 812 (e.g., a keyboard), a user interface (UI) navigation device 814 (e.g., a cursor control device), a disk drive unit 816, a signal generation device 818 (e.g., a speaker) and a network interface device 820.

The disk drive unit 816 includes a machine-readable medium 822 on which is stored one or more sets of instructions and data structures (e.g., software 824) embodying or utilized by any one or more of the methodologies or functions described herein. The software 824 may also reside, completely or at least partially, within the main memory 804 and/or within the processor 802 during execution thereof by the computer system 800, with the main memory 804 and the processor 802 also constituting machine-readable media.

The software 824 may further be transmitted or received over a network 826 via the network interface device 820 utilizing any one of a number of well-known transfer protocols (e.g., Hyper Text Transfer Protocol (HTTP)).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible thing, be that a thing that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

Thus, a method and system for machine learning based method for generating personalized query suggestions in online connection networks has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer implemented method comprising:
training a sequence to sequence machine learning model using historical data associated with searches in an on-line communication network system;
detecting a search request submitted by a user via a user interface provided by the on-line communication network system, the search request comprising a set of word embeddings;
determining a personalization feature associated with the user, the personalization feature comprising at least one of an item of metadata associated with the user, a feature of a user profile, or an item of context information from output of upstream intent detection;
generating search results based on the search request;
prepending the personalization feature to each word embedding from the set of word embeddings;
providing the set of word embeddings, with and the prepended personalization feature, to an encoder of the sequence to sequence machine learning model as input and, in parallel with the generating of the search results, generating a personalized search query suggestion for the user by executing the sequence to sequence machine learning model;
including the search query suggestion, together with the search results generated based on the search request submitted by the user, into a search results user interface for presentation on a display device of the user.

2. The method of claim 1, comprising causing presentation of the search results user interface on a display device of the user.

3. The method of claim 1, wherein the providing, as input to the sequence to sequence machine learning model, the set of word embeddings and the personalization feature, comprises adding the personalization feature into the set of word embeddings.

4. The method of claim 1, comprising generating an expanded data set for training the sequence to sequence machine learning model by adding the personalization feature to the historical data associated with searches in the on-line communication network system.

5. The method of claim 4, comprising training the sequence to sequence machine learning model on the expanded data set.

6. The method of claim 1, wherein the personalization feature is derived from a member characteristic obtained from a member profile that represents the user in the on-line communication network system.

7. The method of claim 6, wherein the member characteristic obtained from the member profile is an industry identification, a skill, or a professional title.

8. The method of claim 1, wherein the personalization feature represents a language derived from an interface provided by a computer system of the user.

9. The method of claim 1, comprising:
detecting a selection of a suggestion from the suggested queries presented on the display device of the user; and
processing the selected suggestion to produce a further set of search results to be presented to the user.

10. A system comprising:
one or more processors; and
a non-transitory computer readable storage medium comprising instructions that when executed by the one or processors cause the one or more processors to perform operations comprising:
training a sequence to sequence machine learning model using historical data associated with searches in an on-line communication network system;
detecting a search request submitted by a user via a user interface provided by the on-line communication network system, the search request comprising a set of word embeddings;
determining a personalization feature associated with the user, the personalization feature comprising at least one of an item of metadata associated with the user, a feature of a user profile, or an item of context information from output of upstream intent detection;
generating search results based on the search request;
prepending the personalization feature to each word embedding from the set of word embeddings;
providing the set of word embeddings, with the prepended personalization feature, to an encoder of the sequence to sequence machine learning model as input and, in parallel with the generating of the search results, generating a personalized search query suggestion for the user by executing the sequence to sequence machine learning model;
including the search query suggestion, together with the search results generated based on the search request submitted by the user, into a search results user interface for presentation on a display device of the user.

11. The system of claim 10, comprising causing presentation of the search results user interface on a display device of the user.

12. The system of claim 10, wherein the providing, as input to the sequence to sequence machine learning model, the set of word embeddings and the personalization feature, comprises adding the personalization feature into the set of word embeddings.

13. The system of claim 10, comprising generating an expanded data set for training the sequence to sequence machine learning model by adding the personalization feature to the historical data associated with searches in the on-line communication network system.

14. The system of claim 13, comprising training the sequence to sequence machine learning model on the expanded data set.

15. The system of claim 10, wherein the personalization feature is derived from a member characteristic obtained from a member profile that represents the user in the on-line communication network system.

16. The system of claim 15, wherein the member characteristic obtained from the member profile is an industry identification, a skill, or a professional title.

17. The system of claim 10, wherein the personalization feature represents a language derived from an interface provided by a computer system of the user.

18. A machine-readable non-transitory storage medium having instruction data executable by a machine to cause the machine to perform operations comprising:
training a sequence to sequence machine learning model using historical data associated with searches in an on-line communication network system;
detecting a search request submitted by a user via a user interface provided by the on-line communication network system, the search request comprising a set of word embeddings;
determining a personalization feature associated with the user, the personalization feature comprising at least one of an item of metadata associated with the user, a feature of a user profile, or an item of context information from output of upstream intent detection;
generating search results based on the search request;
prepending the personalization feature to each word embedding from the set of word embeddings;
providing the set of word embeddings, with the prepended personalization feature, to an encoder of the sequence to sequence machine learning model as input and, in parallel with the generating of the search results, generating a personalized search query suggestion for the user by executing the sequence to sequence machine learning model;
including the search query suggestion, together with the search results generated based on the search request submitted by the user, into a search results user interface for presentation on a display device of the user.

* * * * *